United States Patent [19]
Arnblock

[11] 3,927,510
[45] Dec. 23, 1975

[54] GRASS-CUTTING DEVICES

[75] Inventor: Lennart Oswald Arnblock, Vellinge, Sweden

[73] Assignee: Flymo Societe Anonyme, Zug, Switzerland

[22] Filed: Mar. 14, 1974

[21] Appl. No.: 451,109

[30] Foreign Application Priority Data
Mar. 27, 1973 United Kingdom............... 14591/73

[52] U.S. Cl.................................. 56/12.8; 56/14.7
[51] Int. Cl.² ........................................ A01D 35/264
[58] Field of Search...... 56/12.8, 14.7, 6, 13.5–13.8, 56/14.9

[56] References Cited
UNITED STATES PATENTS
2,218,064  10/1940  Amsbury.......................... 56/14.9 X
2,792,898  5/1957  Mast.................................. 56/14.7 X
3,589,113  6/1971  Svensson............................. 56/12.8

FOREIGN PATENTS OR APPLICATIONS
166,771  2/1956  Australia............................. 56/14.7
43,241  10/1930  Denmark............................. 56/14.7

Primary Examiner—J. N. Eskovitz
Attorney, Agent, or Firm—Laurence R. Brown

[57] ABSTRACT

A self-propelled grass-cutter has a driver-carrier trailer unit extending rearwardly and an air cushion supported grasscutter operated by a blower extending forwardly from a two wheeled drive unit. A center of gravity lies in the plane of the drive wheels and the trailer does not exert vertical force on the drive unit so that the cutter unit weight will tend to tilt forward the cutter to be positioned off the ground by the lifting force of the air cushion.

3 Claims, 3 Drawing Figures

U.S. Patent   Dec. 23, 1975   3,927,510
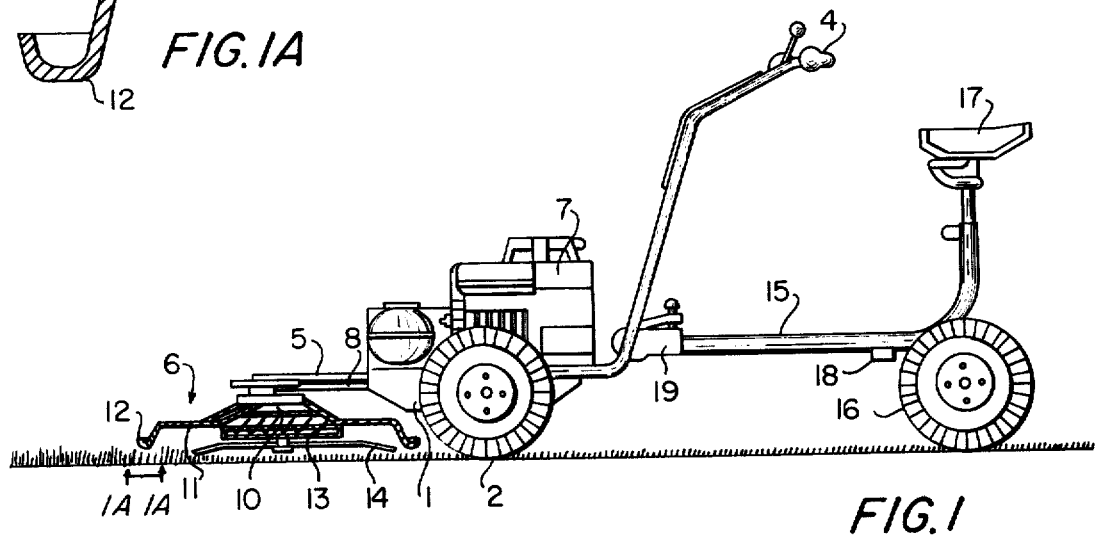
FIG. IA
FIG. I
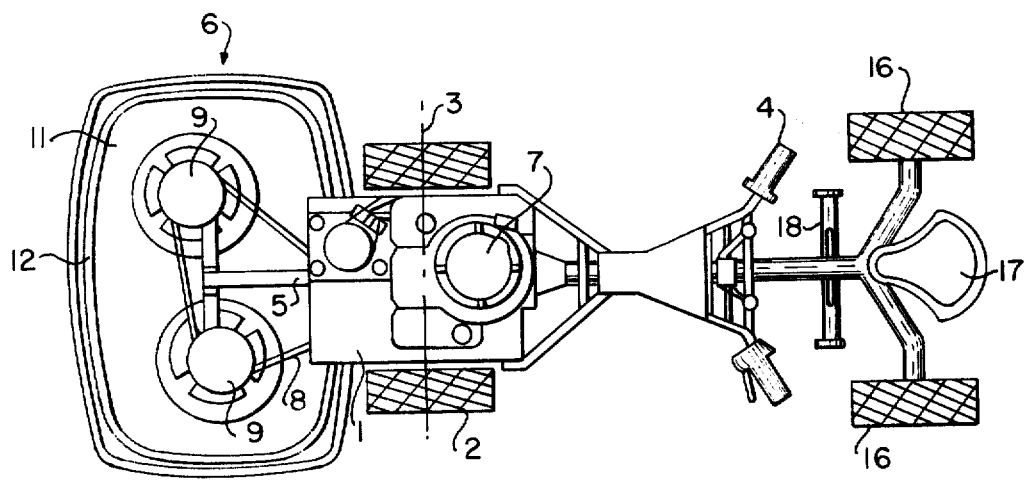
FIG. 2

GRASS-CUTTING DEVICES

This invention relates to a grass-cutting device of the kind (herein called "the kind defined") comprising a self-propelling unit supported on two wheels rotatably mounted to rotate around a common axis and supporting a chassis carrying a power source and provided with rigidly-connected rearwardly-extending handle-bars and forwardly-extending supporting means for a cutter unit comprising a housing accommodating at least one cutter, a two-wheeled trailer driver-carrier unit being pivotally connected to a rearwardly-extending part of the chassis. The rigid connection of the handle-bars to the chassis may be such as to allow height or angle adjustment in a conventional manner. The forwardly-extending supporting means may be rigidly-connected to the chassis and/or to the cutter unit housing, or they may be such as to allow tilting of the housing.

In some known devices of the kind defined the cutter unit has been rigidly connected to the chassis and supported on one or more caster wheels so that the self-propelling unit and cutter unit together form a vehicle supported on at least three wheels. The use of a two-wheeled trailer unit carrying the driver and pivotally connected to the self-propelled unit will make the device very manoeuvrable provided that the cutter unit is lifted from the ground so that restriction of the turning movements of the self-propelling unit is not caused by the caster wheel or caster wheels.

One object of the present invention is to provide a cutting device of the kind defined which may retain good manoeuvrability during use of the cutter unit.

According to the present invention there is provided a grass-cutting device of the kind defined herein, characterised in that said self-propelling unit, apart from the cutter unit, has its centre of gravity located substantially in a vertical plane extending through the common axis of the wheels, and that the trailer unit, when carrying a person, exerts substantially no force in the vertical direction upon the self-propelled unit, and that when the device is in operation the cutter unit is supported on a cushion of air established by blower means powered through a transmission system connected to said power source carried by the chassis.

How the invention may be put into practice is described with reference to the accompanying drawing, in which . . . . .

FIG. 1 is a side view of a device according to the invention partly in vertical section, FIG. 1A is a detailed partial section view of the edge rim as viewed from lines 1A—1A in FIG. 1, and FIG. 2 is a view from above of the device shown in FIG. 1.

The illustrated device comprises a rigid frame or chassis 1 of a self-propelled unit supported on a pair of wheels 2 journalled for rotation around a common axis 3. The self-propelled unit is provided with a pair of adjustable or non-adjustable rigidly-connected handle-bars 4 extending rearwardly, and with a supporting bar 5 extending forwardly relative to the self-propelled unit. Said supporting bar 5 carries a cutter unit generally indicated by 6. The frame 1 carries a power source 7 connected by a belt 8 to two pulleys 9 each carried by a respective one of two shafts 10 in the cutter unit 6. The self-propelled unit is designed so that its center of gravity is located substantially vertically above the axis 3, the weight of the cutter unit 6 not being taken into account. The cutter unit 6 comprises a housing 11 terminating downwardly in a rim 12 and accommodating blower wheels 13 and rotary-scythe cutters 14 carried by the respective shafts 10.

A trailer unit comprising a frame 15 supported by two wheels 16 mounted to rotate around a common axis and provided with a saddle 17 and a footrest 18 for a driver is pivotally connected at 19 to the self-propelling unit. The center of gravity of the trailer unit carrying a driver is located substantially above the common axis of the two wheels 16, and consequently any vertical forces exerted on the self-propelling unit at the pivot 19 by the trailer unit are small during the use of the device.

During operation the cutter unit 6 will follow the ground due to its weight tending to tilt forwardly the otherwise balanced self-propelling unit. However, the blower wheels 13 will create a cushion of air supporting the housing 11 so that a small distance between the rim 12 and the ground will be maintained. The rim 12 has a cross-sectional shape as shown in the encircled detail to an enlarged scale in FIG. 1.

The said cushion of air will be able to support a weight substantially greater than the actual weight of the cutter unit 6, and will thus be able to resist even a substantial force tending to tilt the self-propelling unit down forwardly.

During operation the air from the air cushion will escape between the rim 12 and the ground at a high velocity and in a substantially horizontal direction. This flow of air between the surfaces of the rim 12 and the ground will create an attraction between the said surfaces — counteracted by the supporting action of the air cushion. Thus, if the handle-bars 4 of the self-propelling unit are forced downwardly (tending to cause a rearward tilting of the self-propelling unit) the attraction between the rim 12 and the ground will increase. As an example it can be mentioned that if the cutter unit 6 has a weight of about 30 pounds it may be necessary to exert a lifting force of about 60 pounds on the cutter unit 6 in order to lift it from the ground when in operation.

This inherent vertical stability of the cutter unit 6 when supported on a cushion of air is used to allow the device to comprise two interconnected wheeled units, each being supported by only two wheels. Such a device will have an extremely good manoeuvrability in use. It will be understood that cutting may be performed e.g. when the device is stationary if the handle-bars are caused to swing relative to the frame of the trailer unit. In such a case the cutter unit 6 will perform a swinging movement about a center located between the wheels 2. Such a cutting operation has been difficult or impossible to effect with self-propelling mowers of known types without servo-operated cutters.

What is claimed is:

1. A grass-cutting device with a self-propelling drive unit having two wheels on a common axis, comprising in combination, drive unit structure providing a center of gravity located substantially in a vertical plane extending through the common axis of the wheels, a two-wheeled trailer unit for carrying a person with structure adapted to distribute substantially the entire weight of the trailer unit and the person to the wheels of the trailer unit, means pivotably attaching the trailer unit to the drive unit to allow vertical relative movement between the trailer unit and the drive unit, a cutter unit supportable on a cushion of air, and means attaching the cutter unit to said drive unit at a horizontal distance forward of said drive unit wheel axis with a member allowing the weight of the cutter unit to tilt said drive unit forwardly tending to carry the cutter unit toward the ground.

2. A device as defined in claim 1 wherein the cutter unit comprises at least one rotary blower providing said cushion of air, and the drive unit comprises a power source with a drive connection to said blower of said cutter unit.

3. A device as defined in claim 2 wherein the drive unit has a handle-bar arrangement and the trailer unit comprises a seat arranged so that a seated rider may steer the device by said handle-bar arrangement.

* * * * *